United States Patent [19]

Fujita

[11] Patent Number: 5,536,761
[45] Date of Patent: *Jul. 16, 1996

[54] WATER BASE DYE INK COMPOSITION

[75] Inventor: Hisanori Fujita, Osaka, Japan

[73] Assignee: Sakura Color Products Corporation, Osaka, Japan

[ * ] Notice: The term of this patent shall not extend beyond the expiration date of Pat. No. 5,334,649.

[21] Appl. No.: 163,747

[22] Filed: Dec. 7, 1993

[30] Foreign Application Priority Data

Dec. 7, 1992 [JP] Japan .................................. 4-326699
Nov. 16, 1993 [JP] Japan .................................. 5-286373
Nov. 16, 1993 [JP] Japan .................................. 5-286374

[51] Int. Cl.$^6$ .............................. C08L 33/08; C09D 11/16
[52] U.S. Cl. .......................... 523/160; 523/161; 524/558; 106/20 A; 260/DIG. 38
[58] Field of Search .................... 523/160, 161; 524/558; 106/20 A; 260/DIG. 38

[56] References Cited

U.S. PATENT DOCUMENTS 4,334,878  6/1982  Cutler et al. ............................. 524/88
5,281,262  1/1994  Saito ........................................ 106/20 R
5,334,649  8/1994  Fujita ....................................... 524/558

Primary Examiner—Paul R. Michl
Assistant Examiner—John J. Guarriello
Attorney, Agent, or Firm—Wenderoth, Lind & Ponack

[57] ABSTRACT

A water base dye ink composition which comprises:
- (i) water as a solvent;
- (ii) a carboxyl group containing styrenic resin having an average weight of 1500–30000 and an acid value of 150–300, in an amount of 2–20% by weight;
- (iii) at least one anionic dye selected from the group consisting of:
  - (a) a metal complex azo acid dye;
  - (b) C.I. direct black; and
  - (c) C.I. acid yellow 110, C.I. acid yellow 127, C.I. direct yellow 100, C.I. 20215, C.I. 20216, C.I. 20230, C.I. 23266, C.I. 23635, C.I. 40002, C.I. 40215, C.I. 42655 and C.I. 42660, in an amount of 0.01–10% by weight; and
- (iv) an alkali which is volatile at normal temperatures in such an amount as put the ink composition at a pH in the range of 6 to 9.5.

4 Claims, No Drawings

WATER BASE DYE INK COMPOSITION

FIELD OF THE INVENTION

This invention relates to a water resistant water base dye ink composition, more particularly to a water base ink composition which contains a specific anionic dye as a colorant and is yet water resistant, and which writes on an impervious surface such as of resin or metal as well as on a previous surface such as of paper, suitable for use in a marking pen for writing which has a porous pen tip and an ink reservoir, or a drawing ink for brush painting, pen drawing or air brushing in designing use.

BACKGROUND OF THE INVENTION

In general, a water and light resistant ink composition for use in recording exemplified by an ink composition for use in writing instruments are divided into two groups. The first is an oil base or organic solvent base ink composition, and the second is a water base ink composition. The oil base ink composition contains a dye which is soluble in an organic solvent, but is insoluble in water, and it has an advantage that it can write on an impervious surface such as of glass or resin as well as on a pervious surface such as of paper. However, the oil base ink composition usually contains an aromatic hydrocarbon such as xylene or toluene as the organic solvent, and consequently there is a fear that such a solvent might be injurious to the health. In addition, the oil base ink composition has a disadvantage that when it is used to writeon paper, it readily penetrates or permeates through the paper to the back.

In turn, the conventional water base ink composition uses a water insoluble pigment as a colorant, so that it has no such a problem as involved in the oil base ink composition. However, the conventional water base pigment ink composition has a disadvantage that the pigment used precipitates with time to cause color separation, or a porous pen tip is clogged, or a writing formed therewith has no sufficient darkness when used in a marking pen.

Thus, in the production of water base ink composition containing a water soluble dye as a colorant, the employment of a direct dye, or an additive such as a wetting agent, has been heretofore proposed in order to make a writing formed therewith water resistant. However, there has not yet been developed such a water base dye ink composition which forms a sufficiently water resistant writing on a pervious writing surface such as paper.

BRIEF SUMMARY OF THE INVENTION

It is an object of the invention to provide a water base dye ink composition for writing or drawing which writes well on an impervious surface like an oil base ink composition as well as on a pervious surface, and forms a writing of sufficient water resistance, and in addition, which does not permeate through a pervious substrate such as paper to the back when being used to write on such a pervious substrate.

It is a further object of the invention to provide a water base dye ink composition suitable for use in a marking pen ink or drawing ink with no change in color after storage over a long period of time.

According to the invention, there is provided a water base dye ink composition which comprises:

(i) water as a solvent;

(ii) a carboxyl group containing styrenic resin having an average molecular weight of 1500–30000 and an acid value of 150–300, in an amount of 2–20% by weight;

(iii) at least one anionic dye selected from the group consisting of:
 (a) a metal complex azo acid dye;
 (b) C.I. direct black; and
 (c) C.I. acid yellow 110, C.I. acid yellow 127, C.I. direct yellow 100, C.I. 20215, C.I. 20216, C.I. 20230, C.I. 23266, C.I. 23635, C.I. 40002, C.I. 40215, C.I. 42655 and C.I. 42660, in an amount of 0.01–10% by weight; and (iv) an alkali which is volatile at normal temperatures in such an amount as put the ink composition at a pH in the range of 6 to 9.5.

DETAILED DESCRIPTION OF THE INVENTION

Herein the specification, the anionic dye is a dye which has an acid group such as a carboxyl or a sulfo group in the molecule; the direct dye is such a dye that can dye cotton by a conventional process of dyeing among the anionic dyes; and the acidic dye is such a dye that fails to dye cotton by a conventional process of dyeing among the anionic dyes. The metal complex azo acid dye is an azo dye in the form of metal complex among the acidic dyes. On the other hand, according to the color index naming of dyes, the direct, acid and basic dyes are divided into eight groups: black, yellow, orange, red, violet, blue, green and brown, based on their coloration.

The ink composition of the invention is suitable for use as a marking pen ink or a drawing ink. The marking pen is a writing instrument which has an ink reservoir composed of a porous body such as felt or a bundle of fibers, impregnated with an ink composition within a hollow holder and a porous pen tip composed of a porous material such as felt, fiber or resin to which the ink composition is supplied from the reservoir by making use of capillary phenomenon, thereby permitting to write.

The drawing ink is an ink composition which is used in a various manner in drawing, for instance, it is used for bruch painting, pen drawing, or air brushing.

It is necessary that the styrenic resin is dissolved in water together with the other components to form a uniform ink composition which is adjusted or put at a pH in the range of 6 to 9.5 by an alkali also dissolved in the ink composition, accordingly, it is necessary that the styrenic resin has an acid value of 150–300. When the styrenic resin has an acid value of less than 150, it has not a sufficient amount of carboxyl groups to render the resin sufficiently water soluble, so that the resin has an insufficient solubility in water, and eventually the resulting ink composition fails to form a writing of a sufficient water resistance. On the other hand, when the styrenic resin has an acid value of more than 300, the resin itself is significantly water soluble, so that the resultant ink composition provides a writing of insufficient water resistance.

It is further necessary that the styrenic resin has an average molecular weight of 1500–30000. When the styrenic resin has an average molecular weight of less than 1500, the resultant writing formed on an impervious surface such as of glass or resin has an insufficient adhesion to the surface, and also an insufficient water resistance. When the styrenic resin has an average molecular weight of more than 30000, the resultant ink composition has an excessively large viscosity, and hence it deteriolates in the writability. In addition, such a resin has a reduced solubility in water, so that the resultant ink composition is reduced in adhesion of writing on a writing surface. It is most preferred that the styrenic resin has an acid value in the range of 180 to 250 and an average molecular weight in the range of 1800 to 15000.

The carboxyl group containing styrenic resin used in the invention includes, for example, a styrene-acrylic acid resin and a half esterified styrene-maleic acid resin.

It is preferred that the styrene-acrylic acid resin is a copolymer mainly composed of styrene and (meth)acrylic acid, and if necessary together with an ester of (meth)acrylic acid with an aliphatic alcohol of up to ten carbons or phenol, such as methyl, ethyl, butyl, hexyl, 2-ethylhexyl or phenyl ester, in such an amount as not to put the resultant copolymer at an acid value of less than 150.

It is preferred that the half esterified styrene-maleic acid resin is such a resin wherein the maleic acid component is half-esterified, or is a styrene-maleic acid half ester copolymer, which may have a unit structure (II) represented by

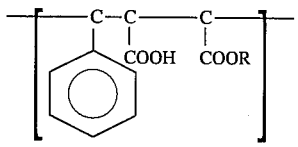

wherein R is an alkyl group usually of 1–10 carbons.

A styrene-maleic an hydride resin in which the maleic anhydride component retains the anhydride structure and a styrene-maleic acid resin in which the maleic acid component has completely free carboxyl groups or a dibasic acid structre have an acid value of more than 300, and accordingly they can not be suitably used in the invention.

The half esterified styrene-maleic acid resin used in the invention may contain isobutylene components therein.

The styrene-acrylic acid resin and the half esterified styrene-maleic acid resin used in the invention may be commercially available.

The styrenic resin suitable for use in the invention will be mentioned below together with its molecular weight and acid value.

| Styrene-Acrylic Resins | | |
| --- | --- | --- |
| Trade Name | Molecular Weight | Acid Value |
| Johncryl 67 | 10000 | 195 |
| Johncryl 678 | 7000 | 200 |
| Johncryl 680 | 3900 | 215 |
| Johncryl 682 | 1600 | 235 |
| Johncryl 550 | 7500 | 200 |
| Johncryl 555 | 5000 | 200 |
| Johncryl 683 | 7300 | 150 |
| Johncryl B-36 | 6800 | 250 |
| (available from S. C. Johnson & Son, Inc., U.S.A.) | | |

The half-esterified styrene-maleic acid resin suitable for use in the invention will be mentioned below together with its molecular weight and acid value.

| Half-Esterified Styrene-Maleic Acid Resins | | |
| --- | --- | --- |
| Trade Name | Molecular Weight | Acid Value |
| Hairos X-200 | 14000 | 190 |
| Hairos X-201 | 14000 | 200 |
| Hairos X-203 | 14000 | 220 |
| Hairos X-205 | 9000 | 205 |
| Hairos X-220 | 14000 | 155 |
| Hairos X-1202S | 14000 | 190 |
| Hairos X-1216S | 14000 | 150 |
| (available from Seiko Kagaku K.K., Japan) | | |
| SMA Resin 1440 | 2500 | 175 |
| SMA Resin 17352 | 1700 | 270 |
| SMA Resin 2625 | 1900 | 220 |
| (available from ARCO Chemical K.K., Japan) | | |

The ink composition of the invention contains the styrenic resin in an amount of 2–20% by weight. When the content of the styrenic resin is less than 2% by weight, the resulting ink composition fails to form a water resistant writing, whereas when the content of the styrenic resin is more than 20% by weight, the resultant ink composition has an excessively large viscosity, and writes bad. The preferred amount of the styrenic resin in the ink composition is in the range of 5–15% by weight.

The water base dye ink composition of the invention contains at least one anionic dye selected from the group consisting of:

(a) a metal complex azo acid dye;

(b) C.I. direct black; and (c) C.I. acid yellow 110, C.I. acid yellow 127, C.I. direct yellow 100, C.I. 20215, C.I. 20216, C.I. 20230, C.I. 23266, C.I. 23635, C.I. 40002, C.I. 40215, C.I. 42655 and C.I. 42660.

The metal complex azo acid dye (a) is exemplified by C.I. 13900, C.I. 18745, C.I. 12205, C.I. 18762, C.I. 13425, C.I. 15691, C.I. 15711 and C.I. 18165.

The metal complex azo acid dye (a) further includes, for example, C.I. acid yellow 59, C.I. acid yellow 111, C.I. acid yellow 112, C.I. acid yellow 116, C.I. acid yellow 161, C.I. acid orange 82, C.I. acid orange 87, C.I. acid orange 88, C.I. acid orange 95, C.I. acid orange 122, C.I. acid orange 147, C.I. acid red 209, C.I. acid red 211, C.I. acid red 215, C.I. acid red 216, C.I. acid red 217, C.I. acid red 256, C.I. acid red 262, C.I. acid red 317, C.I. acid red 355, C.I. acid violet 66, C.I. acid violet 75, C.I. acid violet 116, C.I. acid blue 167, C.I. acid blue 168, C.I. acid blue 171, C.I. acid blue 234, C.I. acid blue 250, C.I. acid blue 276, C.I. acid brown 30, C.I. acid brown 44, C.I. acid brown 45, C.I. acid brown 46, C.I. acid brown 224, C.I. acid brown 282, C.I. acid brown 283, C.I. acid brown 294, C.I. acid brown 295, C.I. acid brown 296, C.I. acid brown 297, C.I. acid brown 333, C.I. acid brown 352, C.I. acid brown 353, C.I. acid brown 368, C.I. acid brown 369, C.I. acid green 43, C.I. acid green 60, C.I. acid green 76, C.I. acid green 77, C.I. acid green 80, C.I. acid black 52:1, C.I. acid black 107, C.I. acid black 110, C.I. acid black 132, C.I. acid black 155 and C.I. acid black 179.

The C.I. direct black (b) includes, for example, C.I. direct black 154, C.I. 27700, C.I. 35255, C.I. 35435, C.I. 35440, C.I. 30235, C.I. 27720, C.I. 31600 and C.I. 30400.

The anionic dye (c) is a dye which belongs neither to the metal complex azo acid dye (a) nor to the C.I. direct black (b), but is a direct dye or an acid dye which can be suitably used in the invention.

The ink composition of the invention contains at least one of the anionic dyes as above mentioned in an amount of 0.01–10% by weight. When the anionic dye is used in an amount of less than 0.01% by weight, the resultant ink composition has an insufficient darkness, and also a poor light resistance, whereas when the anionic dye is used in an amount of more than 10% by weight, the dye or resin may precipitate, or the resultant ink composition may have an excessively large viscosity, and hence writes bad. It is particularly preferred that the ink composition contains the antionic dye in an amount of 0.05–8% by weight.

The ink composition of the invention is a water base ink composition which contains such a styrenic resin and an anionic dye as set forth above, and is adjusted at a pH in the range of 6 to 9.5 by addition of an alkali thereto. When the pH is smaller than 6, the styrenic resin is not dissolved stably in the ink composition, whereas the pH is larger than 9.5, the anionic dye is unstable in the ink composition, and there may take place change in color of the ink composition or precipitation of dye on account of destruction of dye. The resin used also may precipitate, or the ink composition may deteriorate on account of hydrolysis of the resin used.

The alkali used in the invention is water soluble, and volatile at normal temperatures. The alkali plays an important role in the ink composition of the invention. Firstly, the alkali makes the ink composition alkaline to make it possible for the styrenic dye to be stably dissolved therein. Secondly, when there has been formed a writing with such an ink composition, and when the solvent has evaporated and the writing has been dried, the styrenic resin encloses the anionic dye to form a water insoluble colorant, thereby forming a water resistant writing, although a definite reason has not yet been clarified.

There may be mentioned as such an alkali used in the invention, for example, ammonia water or water soluble organic amine compounds such as trimethyl amine or triethyl amine, with ammonia being preferred.

It is preferred that the alkali is used in an amount of 85–105% of the amount required to neutralize the carboxyl groups of the styrenic resin used. When the amount of the alkali is less than 85% of the amount required to neutralize the carboxyl groups of the styrenic resin used, the resultant ink composition may have a pH of less than 6. When the ink composition has a pH of less than 6, the styrenic resin has a reduced solubility in water, and accordingly the resultant ink composition may be uneven. Contrary to the above, when the amount of the alkali is more than 105% of the amount required to neutralize the carboxyl groups of the styrenic resin used, the resultant ink composition may have a pH of more than 9.5. In such an ink composition, the resin may be hydrolyzed at its ester structures to form precipitates, or the anionic dye used may be decomposed to bring about precipitation or change in color of the ink composition.

An alkali which is nonvolatile at normal temperatures may be preferably used together with the volatile alkali. The nonvolatile alkali may retain the desirable pH of the ink composition for a longer period of time, thereby improving storage stability. The incorporation of the nonvolatile alkali may be also useful to prevent the ink composition from evaporating from a pen tip of a marking pen when it has been left standing for a long time with its cap removed therefrom, and thus ensures a good writability over a long period of time, preventing the formed writing from becoming blurred. The amount of the nonvolatile alkali used is up to 50% of the amount required to neutralize the carboxyl groups of the styrenic resin used. Such a nonvolatile alkali used may include, for example, an alkali metal hydroxide such as sodium hydroxide or potassium hydroxide, or an alkanolamine such as triethanolamine, ethyldiethanolamine, diethylmonoethanolamine, methyldiethanolamine or dimethylmonoethanolamine. The nonvolatile alkali may be used singly or as a mixture.

The solvent of the ink composition of the invention is water, preferably ion-exchanged water. Water is the balance of the ink composition of the invention, and it is used usually in an amount of 40–85% by weight based on the ink composition.

The ink composition of the invention may contain a water soluble organic solvent to prevent the evaporation of water from the ink composition during storage, and also to improve the solubility of anionic dye in the ink composition.

The water soluble organic solvent used is a glycol or a glycol monoether which preferably has the formula (I)

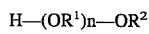

wherein when $R^1$ is an ethylene group and $R^2$ is a hydrogen, n is an integer of 1 to 4; when $R^1$ is an ethylene group and $R^2$ is a methyl group, n is 1 or 2; and when $R^1$ is a propylene group, $R^2$ is a hydrogen or a methyl group, and n is 1 or 2.

Accordingly, the water soluble organic solvent used includes, for example, a (di-, tri- or tetra)alkylene glycol such as ethylene glycol, propylene glycol, diethylene glycol, dipropylene glycol, triethylene glycol or tetraethylene glycol; and a monoalkyl ether of (di)alkylene glycol such as ethylene glycol monoethyl ether, ethylene glycol monomethyl ether, diethylene glycol monomethyl ether, propylene glycol monomethyl ether or dipropylene glycol monomethyl ether.

Further according to the invention, the ink composition may contain, as a water soluble organic solvent, an aliphatic lower alcohol such as ethanol, isopropyl alcohol, n-propyl alcohol or butanol; or an aliphatic polyhydric alcohol such as glycerine.

The water soluble organic solvent may be contained in an amount of up to 40% by weight, and preferably in an amount of 3–30% by weight, based on the ink composition.

The use of a high molecular weight, water soluble polyethylene glycol is avoided. When such a polyethylene glycol is used, the resultant ink composition forms such a writing on an impervious writing surface in which substantially all the polyethylene glycol remains therein for a long time after writing, so that the writing is poor in water resitant. Further, the ink composition has an excessively large viscosity, and writes bad.

In addition to the above, the ink composition of the invention may further contain, if necessary, an antiseptic, an antifungal or a surfactant, either nonionic, anionic or cationic.

The invention is not limited by any theory, however, according to the ink composition of the invention, the styrenic resin forms salts at its carboxyl groups with the alkali while forming micelie to enclose the anionic dye, and thus dissolves in a solution stably together with the anionic dye.

In use of the ink composition of the invention, when a writing is formed and the alkali evaporates therefrom, namely, when the writing is dried, it is likely that the styrenic resin forms a water insoluble resin film while enclosing the anionic dye therein thereby making the writing water resistant. It seems necessary that the anionic dye is enveloped in the styrenic resin so that the resultant writing is water resistant, and this may be the reason why the specific anionic dyes can be suitably used in the invention.

The ink composition of the invention can write well not only on a pervious surface but also on an impervious surface, The invention will be set forth in detail with reference to examples, however, the invention is not limited there to. In the examples, parts are parts by weight.

I. Ink Composition Containing Styrene-Acrylic Resin

The examples 15, 18, 19 and 22 use a metal complex azo acid dye (a); the examples 12, 16, 17, 20, 23 and 24 use a C.I. direct black; and the other examples use an acid dye or a direct dye falling under the group (c).

Further, the examples 1–8, 17 and 18 adjust the pH of the ink composition with ammonia water, while the others with ammonia water and a nonvolatile alkali. When a nonvolatile alkali is used in the preparation of an ink composition, the percentage of the amount used to the theoretical amount necessary to completely neutralize the carboxyl groups of the styrenic resin is indicated in parentheses.

EXAMPLE 1

A given amount of 28% ammonia water was added to ion-exchanged water, and was added thereto Johncryl 67 under stirring, followed by further stirring for five hours at a temperature of less than 40° C. Thereafter, the resultant mixture was heated to 85° C. and was then maintained at the temperature for one hour, and then cooled to room temperature, to provide a 25% aqueous solution of Johncryl 67 of neutralization degree of 100%, which is referred to as the resin solution 1.

| Resin Solution 1 | |
| --- | --- |
| Ion-exchanged water | 69.7 parts |
| 28% ammonia water | 5.3 parts |
| Johncryl 67 | 25.0 parts |

The resin solution 1 was mixed with the components below under stirring to provide a yellow color drawing ink having a pH of 7.8.

| Ethylene glycol | 5.0 parts |
| --- | --- |
| Ion-exchanged water | 53.6 parts |
| C.I. Acid Yellow 110 | 0.4 parts |
| Sodium benzoate | 1.0 part |
| Resin solution 1 | 40.0 parts |

EXAMPLE 2

The resin solution 1 was mixed with the components below under stirring to provide a red marking pen ink having a pH of 8.0.

| Ethylene glycol | 20.0 parts |
| --- | --- |
| Ion-exchanged water | 34.5 parts |
| C.I. 23635 | 4.5 parts |
| Sodium benzoate | 1.0 part |
| Resin solution 1 | 40.0 parts |

EXAMPLE 3

A 25% aqueous solution of Johncryl B-36 having a neutralization degree of 90% was prepared as a resin solution 2 in the same manner as in the preparation of the resin solution 1.

| Resin Solution 2 | |
| --- | --- |
| Ion-exchanged water | 68.9 parts |
| 28% ammonia water | 6.1 parts |
| Johncryl B-36 | 25.0 parts |

The resin solution 2 was mixed with the components below under stirring to provide an ultramarine color drawing ink having a pH of 7.3.

| Ethylene glycol | 5.0 parts |
| --- | --- |
| Ion-exchanged water | 53.4 parts |
| C.I. 42660 | 0.6 parts |
| Sodium benzoate | 1.0 part |
| Resin solution 2 | 40.0 parts |

EXAMPLE 4

The resin solution 2 was mixed with the components below under stirring to provide a blue color marking pen ink having a pH of 7.3.

| Ethylene glycol | 20.0 parts |
| --- | --- |
| Ion-exchanged water | 29.0 parts |
| C.I. 42655 | 5.0 parts |
| Sodium benzoate | 1.0 part |
| Resin solution 2 | 40.0 parts |

EXAMPLE 5

The resin solution 1 was mixed with the components below under stirring to provide an orange color marking pen ink having a pH of 7.9.

| Propylene glycol | 20.0 parts |
| --- | --- |
| Ion-exchanged water | 34.5 parts |
| C.I. Direct Orange 18*) | 4.5 parts |
| Sodium benzoate | 1.0 part |
| Resin solution 1 | 40.0 parts |

*) C.I. Direct Orange 18 is a mixture of C.I. 20215, C.I. 20216 and C.I. 20230.

EXAMPLE 6

The resin solution 1 was mixed with the components below under stirring to provide an orange color marking pen ink having a pH of 8.0.

| Propylene glycol | 20.0 parts |
| --- | --- |
| Ion-exchanged water | 33.5 parts |
| C.I. 40002 | 5.5 parts |
| Sodium benzoate | 1.0 part |
| Resin solution 1 | 40.0 parts |

EXAMPLE 7

The resin solution 2 was mixed with the components below under stirring to provide an orange color marking pen ink having a pH of 8.0.

| | |
|---|---|
| Ethylene glycol | 20.0 parts |
| Ion-exchanged water | 34.0 parts |
| C.I. 40215 | 5.0 parts |
| Sodium benzoate | 1.0 part |
| Resin solution 2 | 40.0 parts |

EXAMPLE 8

The resin solution 2 was mixed with the components below under stirring to provide a yellow color marking pen ink having a pH of 7.4.

| | |
|---|---|
| Ethylene glycol | 20.0 parts |
| Ion-exchanged water | 33.0 parts |
| C.I. Direct Yellow 100 | 6.0 parts |
| Sodium benzoate | 1.0 part |
| Resin solution 2 | 40.0 parts |

EXAMPLE 9

A given amount of 28% ammonia water and methyldiethanolamine were added to ion-exchanged water, and was added thereto Johncryl 550 under stirring, followed by further stirring for five hours at a temperature of less than 40° C. Thereafter, the resultant mixture was heated to 85° C. and was then maintained at the temperature for one hour, and then cooled to room temperature, to provide a 25% aqueous solution of Johncryl 550 of neutralization degree of 100%, which is referred to as the resin solution 3.

| Resin Solution 3 | |
|---|---|
| Ion-exchanged water | 69.3 parts |
| 28% ammonia water | 5.2 parts |
| Methyldiethanolamine | 0.5 parts (5%) |
| Johncryl 550 | 25.0 parts |

The resin solution 3 was mixed with the components below under stirring to provide a yellow color marking pen ink having a pH of 8.7.

| | |
|---|---|
| Diethylene glycol | 20.0 parts |
| Ion-exchanged water | 34.0 parts |
| C.I. Acid Yellow 110 | 5.0 parts |
| Sodium benzoate | 1.0 part |
| Resin solution 1 | 40.0 parts |

EXAMPLE 10

A 25% aqueous solution of Johncryl 67 having a neutralization degree of 100% and composed of the following components was prepared in the same manner as in the example 9. The solution is referred to as the resin solution 4.

| Resin Solution 4 | |
|---|---|
| Ion-exchanged water | 68.8 parts |
| 28% ammonia water | 4.7 parts |
| Dimethylmonoethanolamine | 0.4 parts (10%) |
| Johncryl 67 | 25.0 parts |

The resin solution 4 was mixed with the components below under stirring to provide a blue color marking pen ink having a pH of 7.9.

| | |
|---|---|
| Propylene glycol | 15.0 parts |
| Propylene glycol monoethyl ether | 5.0 parts |
| Ion-exchanged water | 35.0 parts |
| C.I. 42655 | 4.0 parts |
| Sodium benzoate | 1.0 part |
| Resin solution 4 | 40.0 parts |

EXAMPLE 11

A 25% aqueous solution of Johncryl 683 having a neutralization degree of 100% and composed of the following components was prepared in the same manner as in the example 9. The solution is referred to as the resin solution 5.

| Resin Solution 5 | |
|---|---|
| Ion-exchanged water | 68.5 parts |
| 28% ammonia water | 2.1 parts |
| Ethyldiethanolamine | 4.4 parts (50%) |
| Johncryl 683 | 25.0 parts |

The resin solution 5 was mixed with the components below under stirring to provide a red color marking pen ink having a pH of 8.2.

| | |
|---|---|
| Dipropylene glycol | 15.0 parts |
| Diethylene glycol monomethyl ether | 5.0 parts |
| Ion-exchanged water | 34.0 parts |
| C.I. 23635 | 5.0 parts |
| Sodium benzoate | 1.0 part |
| Resin solution 5 | 40.0 parts |

EXAMPLE 12

A 25% aqueous solution of Johncryl B-36 having a neutralization degree of 100% and composed of the following components was prepared in the same manner as in the example 9, The solution is referred to as the resin solution 6.

| Resin Solution 6 | |
|---|---|
| Ion-exchanged water | 65.2 parts |
| 28% ammonia water | 4.8 parts |
| Triethanolamine | 5.0 parts (30%) |
| Johncryl B-36 | 25.0 parts |

The resin solution 6 was mixed with the components below under stirring to provide a black color marking pen ink having a pH of 9.1.

| | |
|---|---|
| Dipropylene glycol | 20.0 parts |
| Ion-exchanged water | 33.5 parts |
| C.I. 35255 | 5.5 parts |
| Sodium benzoate | 1.0 part |
| Resin solution 6 | 40.0 parts |

EXAMPLE 13

A 25% aqueous solution of Johncryl 67 having a neutralization degree of 100% and composed of the following components was prepared in the same manner as in the example 9. The solution is referred to as the resin solution 7.

| Resin Solution 7 | |
|---|---|
| Ion-exchanged water | 68.5 parts |
| 28% ammonia water | 5.0 parts |
| Sodium hydroxide | 0.2 parts (5%) |
| Johncryl 67 | 25.0 parts |

The resin solution 7 was mixed with the components below under stirring to provide a yellow color marking pen ink having a pH of 8.9.

| Ethylene glycol | 20.0 parts |
|---|---|
| Ion-exchanged water | 34.0 parts |
| C.I. Acid Yellow 110 | 5.0 parts |
| Sodium benzoate | 1.0 part |
| Resin solution 7 | 40.0 parts |

EXAMPLE 14

A 25% aqueous solution of Johncryl 550 having a neutralization degree of 100% and composed of the following components was prepared in the same manner as in the example 9. The solution is referred to as the resin solution 8.

| Resin Solution 8 | |
|---|---|
| Ion-exchanged water | 69.8 parts |
| 28% ammonia water | 4.7 parts |
| Potassium hydroxide | 0.7 parts (15%) |
| Johncryl 550 | 25.0 parts |

The resin solution 8 was mixed with the components below under stirring to provide a blue color marking pen ink having a pH of 8.5.

| Dipropylene glycol | 17.0 parts |
|---|---|
| Dipropylene glycol monomethyl ether | 3.0 parts |
| Ion-exchanged water | 35.0 parts |
| C.I. 42655 | 4.0 parts |
| Sodium benzoate | 1.0 part |
| Resin solution 8 | 40.0 parts |

EXAMPLE 15

The resin solution 7 was mixed with the components below under stirring to provide a black color marking pen ink having a pH of 8.7.

| Ethylene glycol | 15.0 parts |
|---|---|
| Ethylene glycol monomethyl ether | 5.0 parts |
| Ion-exchanged water | 35.0 parts |
| C.I. Acid Black 107 | 4.0 parts |
| Sodium benzoate | 1.0 part |
| Resin solution 7 | 40.0 parts |

EXAMPLE 16

The resin solution 4 was mixed with the components below under stirring to provide a black color marking pen ink having a pH of 8.5.

| Ethylene glycol | 20.0 parts |
|---|---|
| Ion-exchanged water | 33.5 parts |
| C.I. 35255 | 5.5 parts |
| Sodium benzoate | 1.0 part |
| Resin solution 4 | 40.0 parts |

EXAMPLE 17

The resin solution 1 was mixed with the components below under stirring to provide a black color marking pen ink having a pH of 9.2.

| Propylene glycol | 25.0 parts |
|---|---|
| Ion-exchanged water | 29.0 parts |
| C.I. Direct Black 154 | 6.0 parts |
| Resin solution 1 | 40.0 parts |

EXAMPLE 18

The resin solution 2 was mixed with the components below under stirring to provide a brown color marking pen ink having a pit of 7.6.

| Propylene glycol | 25.0 parts |
|---|---|
| Ion-exchanged water | 31.0 parts |
| C.I. Acid Orange 122 | 4.0 parts |
| Resin solution 2 | 40.0 parts |

EXAMPLE 19

The resin solution 6 was mixed with the components below under stirring to provide a yellow color marking pen ink having a pH of 8.3.

| Ethylene glycol | 25.0 parts |
|---|---|
| Ethylene glycol monomethyl ether | 5.0 parts |
| Ion-exchanged water | 26.0 parts |
| C.I. 13900 | 4.0 parts |
| Resin solution 6 | 40.0 parts |

EXAMPLE 20

The resin solution 7 was mixed with the components below under stirring to provide a black color marking pen ink having a pH of 9.5.

| Propylene glycol | 25.0 parts |
|---|---|
| Ion-exchanged water | 29.0 parts |
| C.I. 35255 | 6.0 parts |
| Resin solution 7 | 40.0 parts |

EXAMPLE 21

The resin solution 6 was mixed with the components below under stirring to provide a yellow color marking pen ink having a pH of 8.7.

| Propylene glycol | 20.0 parts |
|---|---|
| Propylene glycol monomethyl ether | 5.0 parts |
| Ion-exchanged water | 30.0 parts |
| C.I. Diret Yellow 100 | 5.0 parts |
| Resin solution 6 | 40.0 parts |

EXAMPLE 22

The resin solution 4 was mixed with the components below under stirring to provide a black color marking pen ink having a pH of 8.5.

| Ethylene glycol | 20.0 parts |
|---|---|
| Ion-exchanged water | 35.0 parts |
| C.I. Acid Black 107 | 5.0 parts |
| Resin solution 4 | 40.0 parts |

EXAMPLE 23

The resin solution 8 was mixed with the components below under stirring to provide a black color marking pen ink having a pH of 9.2.

| Ethylene glycol | 25.0 parts |
|---|---|
| Ion-exchanged water | 30.0 parts |
| C.I. 30235 | 5.0 parts |
| Resin solution 8 | 40.0 parts |

EXAMPLE 24

The resin solution 3 was mixed with the components below under stirring to provide a black color marking pen ink having a pH of 9.0.

| Ethylene glycol | 25.0 parts |
|---|---|
| Ion-exchanged water | 30.0 parts |
| C.I. Acid Black 107 | 5.0 parts |
| Resin solution 3 | 40.0 parts |

There are given ink compositions as comparative examples below. The comparative examples 1, 2, 6 and 8 use a direct dye which falls under neither the group (a) nor the group (b) nor the groups (c), and the comparative examples 3, 4, 5 and 7 use an acid dye which falls under neither the group (a) nor the group (b) nor the groups (c).

Comparative Example 1

The resin solution 1 was mixed with the components below under stirring to provide a red color marking pen ink having a pH of 8.0.

| Ethylene glycol | 20.0 parts |
|---|---|
| Ion-exchanged water | 34.0 parts |
| C.I. 29100 (Direct Red) | 5.0 parts |
| Sodium benzoate | 1.0 part |
| Resin solution 1 | 40.0 parts |

Comparative Example 2

The resin solution 2 was mixed with the components below under stirring to provide a blue color marking pen ink having a pH of 7.6.

| Ethylene glycol | 20.0 parts |
|---|---|
| Ion-exchanged water | 34.5 parts |
| C.I. 24410 (Direct Blue) | 4.5 parts |
| Sodium benzoate | 1.0 part |
| Resin solution 2 | 40.0 parts |

Comparative Example 3

The resin solution 1 was mixed with the components below under stirring to provide a violet color marking pen ink having a pH of 7.9.

| Ethylene glycol | 20.0 parts |
|---|---|
| Ion-exchanged water | 34.5 parts |
| C.I. 42640 (Acid Orange) | 4.5 parts |
| Sodium benzoate | 1.0 part |
| Resin solution 1 | 40.0 parts |

Comparative Example 4

The resin solution 2 was mixed with the components below under stirring to provide a blue color marking pen ink having a pH of 7.3.

| Propylene glycol | 20.0 parts |
|---|---|
| Ion-exchanged water | 34.0 parts |
| C.I. 42090 (Acid Blue) | 5.0 parts |
| Sodium benzoate | 1.0 part |
| Resin solution 2 | 40.0 parts |

Comparative Example 5

The resin solution 2 was mixed with the components below under stirring to provide a yellow color marking pen ink having a pH of 7.2.

| Ethylene glycol | 25.0 parts |
|---|---|
| Ion-exchanged water | 29.0 parts |
| C.I. 19140 (Acid Yellow) | 5.0 parts |
| Sodium benzoate | 1.0 part |
| Resin solution 2 | 40.0 parts |

Comparative Example 6

The resin solution 2 was mixed with the components below under stirring to provide a yellow color marking pen ink having a pH of 7.6.

| Propylene glycol | 25.0 parts |
|---|---|
| Ion-exchanged water | 26.0 parts |
| C.I. 24895 (Direct Yellow) | 8.0 parts |
| Sodium benzoate | 1.0 part |
| Resin solution 2 | 40.0 parts |

Comparative Example 7

The resin solution 1 was mixed with the components below under stirring to provide an orange color drawing ink having a pH of 7.8.

| Ethylene glycol | 7.0 parts |
|---|---|
| Ion-exchanged water | 51.5 parts |
| C.I. 15510 (Acid Orange) | 0.5 parts |
| Sodium benzoate | 1.0 part |
| Resin solution 1 | 40.0 parts |

Note: This ink composition contains a small amount of dye, and hence it is not for use as a marking pen ink, but for use as a drawing ink.

Comparative Example 8

The resin solution 1 was mixed with the components below under stirring to provide an orange color marking pen ink having a pH of 8.0.

| | |
|---|---|
| Propylene glycol | 25.0 parts |
| Ion-exchanged water | 26.0 parts |
| C.I. 22920 (Direct Orange) | 8.0 parts |
| Sodium benzoate | 1.0 part |
| Resin solution 2 | 40.0 parts |

II. Performance Evaluation of Ink Composition Containing Styrene-Acrylic Resin Some of the above ink compositions and some of the conventional ink compositions were subjected to performance evaluation. A pigment ink composition containing a pigment as a colorant and an oil base ink composition were prepared as examples of the conventional ink composition.

The performance evaluation was made with regard to storability, water resistance of writing, light resistance of writing and resistance to penetration of writing through paper to the back.

The ink composition of the example 4 was taken as a representative of the invention, whereas the ink compositions of the comparative examples 2 and 4 were taken as representatives of the ink composition containing an anionic dye other than the specified by the invention.

A pigment ink composition and an oil base ink composition were prepared as follows.

Pigment ink composition

A pigment base was first prepared which was composed of the following components.

| Pigment Base | |
|---|---|
| Johncryl 62 | 30.0 parts |
| Color Black SB-5*) | 22.5 parts |
| Ethylene glycol | 10.0 parts |
| Ion-exchanged water | 37.5 parts |

*) Carbon black available from Degussa, Germany

Using the above pigment base, a pigment ink composition composed of the components below was prepared.

| | |
|---|---|
| Pigment base | 33.3 parts |
| Johncryl 62 | 11.3 parts |
| Neocol YSK*) | 0.4 parts |
| Ethylene glycol | 3.0 parts |
| Ion-exchanged water | 52.0 parts |

*) Sodium dialkyl sulfosuccinate available from Dai-Ichi Kogyo Seiyaku K.K., Japan Oil base ink composition An oil base ink composition was prepared by placing the components below in a reactor, and then stirred, if necessary under heating at a temperature of 50°–80° C., to form an even ink composition.

| | |
|---|---|
| Oil Blue 603*) | 5.0 parts |
| Estergum AAW**) | 16.0 parts |
| Ethylene glycol monoethyl ether | 13.0 parts |
| Xylene | 66.0 parts |

*) Oil soluble dye available from Orient Kagaku Kogyo K.K., Japan
**) Rosin ester available from Arakawa Kagaku Kogyo K.K., Japan Water Resistance A writing was formed on paper and sprayed with water. After the writing was dried, it was examined to check if the writing got blurred.

Light Resistance

An ink composition was coated on paper, and half of the paper was covered with black cloth. The paper was irradiated for four hours with a fade meter, and examined to check if there was any fading or change in color on the irradiated portion.

Storability

A marking pen was prepared which was composed of a hollow holder, an ink reservoir of felt held therein, and a porous pen tip of felt. The marking pen was charged with an ink composition and left standing at 40° C. in a thermostat for one month with the porous pen tip being upward, downward or lateral, or the ink composition was placed in a closed vessel and left standing under the same conditions.

Thereafter, the writability of the ink composition was examined, and the ink composition was also examined to check whether there took place any change in color or precipitation.

Resistance to Penetration through Paper to the Back

A pen porous pen tip of a marking pen was pushed against ten sheets of paper with a pressure of 50 g for three seconds, and then the sheets of paper were examined to check how many sheets the ink composition penetrated. Further, the pen tip was pushed against ten sheets of paper for one second, and then the top sheet of paper was examined how large the diameter of circle the ink composition formed was.

The results are indicated in Table 1 with three grade evaluation of A (excellent), B (good) and C (bad).

TABLE 1

| | Water Resistance | Light Resistance | Storability | Resistance to Penetration |
|---|---|---|---|---|
| Water base pigment ink | B | A | C | B |
| Oil base ink | B | B | B | C |
| Invention | B | B | B | B |
| Anionic dye ink*) | C | B | B | B |

Note:
*) Water base in composition containing an anionic dye other than the specified in the invention.

The ink composition of the invention forms a writing having the substantially same water resistance as the pigment ink composition which contains a pigment as a colorant or the oil base ink composition, both of which are naturally forms a water resistant writing.

However, the pigment ink composition is very poor in storability since the water insoluble pigment is apt to precipitate in the ink composition over a long period storage, whereas the ink composition of the invention has an improved storability since it contains a dye dissloved in the ink composition. The oil base ink composition readily penetrates through paper to the back when used, however, the ink composition of the invention has a good resistance to penetration. The ink composition of the invention also has a good light resistance, substantially the same as the conventional oil base ink composition.

However, a water base ink composition which contains an anionic dye other than the specified according to the invention such as exemplified by he comparative examples 2 (C.I. 24410) or 4 (C.I. 42090) form a writing having substantially no water resistance.

Resistance to Drying

A marking pen was prepared which was composed of a hollow holder, an ink reservoir of felt held therein, a porous pen tip of felt, and a cap for the pen tip. The marking pen was charged with an ink composition and left standing at a temperature of 20° C. and a relative humidity of 65% with the cap being removed from the cap, and the pen was examined to check how long it wrote well.

The ink compositions of the examples 2 and 4 were taken as representatives of ink compositions containing a volatile alkali, and those of examples 10, 13 and 14 as representatives of ink compositions containing a nonvolatile alkali together with a volatile alkali.

It was found that the ink compositions of the examples 2 and 4 were capable of writing well after about one hour, and the ink compositions of the examples 10, 13 and 14 were capable of writing well even after about three hours. Thus, the ink composition containing a nonvolatile alkali is improved in resistance to drying.

III. Ink Composition Containing Half-Esterified Styrene-Maleic acid Resin

The examples 1, 2, 15 and 16 use a metal complex azo acid dye (a); the examples 3, 4, 5, 9, 13 and 17 use a C.I. direct black; and the other examples use an acid dye or a direct dye falling under the group (c).

Further, the examples 13 to 15 adjust the pH of the ink composition with ammonia water, while the others with ammonia water and a nonvolatile alkali. When a nonvolatile alkali is used for the preparation of an ink composition, the percentage of the amount used to the theoretical amount necessary to completely neutralize the carboxyl groups of the styrenic resin is indicated in parentheses.

EXAMPLE 1

A given amount of 28% ammonia water and triethanolamine were added to ion-exchanged water, and was added there to Hairos X-203 under stirring, followed by further stirring for five hours at a temperature of less than 40° C. Thereafter, the resultant mixture was heated to 85° C. and was then maintained at the temperature for one hour, and then cooled to room temperature, to provide a 25% aqueous solution of Hairos X-203 of neutralization degree of 105%, which is referred to as the resin solution 1.

| Resin Solution 1 | |
|---|---|
| Ion-exchanged water | 68.0 parts |
| 28% ammonia water | 4.8 parts |
| Triethanolamine | 2.2 parts |
|  | (15.8%) |
| Hairos X-203 | 25.0 parts |

Note:
The molar ratio of ammonia/triethanolamine was 85/15.

The resin solution 1 was mixed with the components below under stirring to provide a black color drawing ink having a pH of 8.7.

| Ethylene glycol | 5.0 parts |
|---|---|
| Ion-exchanged water | 51.0 parts |
| C.I. Acid Black 107 | 3.0 parts |
| Sodium benzoate | 1.0 part |
| Resin solution 1 | 40.0 parts |

EXAMPLE 2

The resin solution 1 was mixed with the components below under stirring to provide a brown color marking pen ink having a pH of 8.0.

| Ethylene glycol | 14.0 parts |
|---|---|
| Ion-exchanged water | 38.5 parts |
| C.I. Acid Orange 122 | 6.5 parts |
| Sodium benzoate | 1.0 part |
| Resin solution 1 | 40.0 parts |

EXAMPLE 3

A 25% aqueous solution of Haires X-203 having a neutralization degree of 100% and composed of the following components was prepared in the same manner as in the example 1. The solution is referred to as the resin solution 2.

| Resin Solution 2 | |
|---|---|
| Ion-exchanged water | 67.1 parts |
| 28% ammonia water | 4.4 parts |
| Triethanolamine | 3.5 parts |
|  | (25.0%) |
| Hairos X-203 | 25.0 parts |

Note:
The molar ratio of ammonia/triethanolamine was 75/25.

The resin solution 2 was mixed with the components below under stirring to provide a black color drawing ink having a pH of 8.1.

| Propylene glycol | 3.0 parts |
|---|---|
| Ion-exchanged water | 66.4 parts |
| C.I. 35255 | 1.5 parts |
| Resin solution 2 | 30.0 parts |

EXAMPLE 4

The resin solution 2 was mixed with the components below under stirring to provide a black color marking pen ink having a pH of 8.4.

| Propylene glycol | 15.0 parts |
|---|---|
| Ion-exchanged water | 52.5 parts |
| C.I. Direct Black 154 | 4.0 parts |
| Resin solution 2 | 30.0 parts |

EXAMPLE 5

The resin solution 2 was mixed with the components below under stirring to provide a black color marking pen ink having a pH of 8.1.

| Propylene glycol | 25.0 parts |
|---|---|
| Ion-exchanged water | 46.0 parts |
| C.I. 27700 | 4.0 parts |
| Resin solution 2 | 30.0 parts |

EXAMPLE 6

The resin solution 2 was mixed with the components below under stirring to provide a red color marking pen ink having a pH of 8.2.

| Propylene glycol | 20.0 parts |
| Ion-exchanged water | 40.0 parts |
| C.I. 23266 | 5.0 parts |
| Resin solution 2 | 35.0 parts |

EXAMPLE 7

The resin solution 1 was mixed with the components below under stirring to provide a yellow color marking pen ink having a pH of 9.1.

| Propylene glycol | 20.0 parts |
| Ion-exchanged water | 34.0 parts |
| C.I. Acid Yellow 127 | 5.0 parts |
| Sodium bonzoate | 1.0 part |
| Resin solution 1 | 40.0 parts |

EXAMPLE 8

A given amount of 28% ammonia water and methyldiethanolamine were added to ion-exchanged water, and was added thereto Hairos X-205 under stirring, followed by further stirring for five hours at a temperature of less than 40° C. Thereafter, the resultant mixture was heated to 85° C. and was then maintained at the temperature for one hour, and then cooled to room temperature, to provide a 25 aqueous solution of Hairos X-205 of neutralization degree of 100%, which is referred to as the resin solution 3.

| Resin Solution 3 | |
| --- | --- |
| Ion-exchanged water | 68.9 parts |
| 28% ammonia water | 4.7 parts |
| Methyldiethanolamine | 5.4 parts (50%) |
| Hairos X-205 | 25.0 parts |

The resin solution 3 was mixed with the components below under stirring to provide a red color marking pen ink having a pH of 8.2.

| Diethylene glycol | 15.0 parts |
| Ethylene glycol monomethyl ether | 5.0 parts |
| Ion-exchanged water | 34.0 parts |
| C.I. 23635 | 5.0 parts |
| Sodium benzoate | 1.0 part |
| Resin solution 3 | 40.0 parts |

EXAMPLE 9

A 25% aqueous solution of Hairos X-201 having a neutralization degree of 100% and composed of the following components was prepared in the same manner as in the example 8. The solution is referred to as the resin solution 4.

| Resin solution 4 | |
| --- | --- |
| Ion-exchanged water | 63.8 parts |
| 28% ammonia water | 3.8 parts |
| Dimethylethanolamine | 2.4 parts (30%) |
| Hairos X-201 | 25.0 parts |

The resin solution 4 was mixed with the components below under stirring to provide a black color marking pen ink having a pH of 9.1.

| Diethylene glycol | 20.0 parts |
| Ion-exchanged water | 33.5 parts |
| C.I. 35255 | 5.5 parts |
| Sodium benzoate | 1.0 part |
| Resin solution 4 | 40.0 parts |

Example 10

A 25% aqueous solution of Hairos X-200 having a neutralization degree of 100% and composed of the following components was prepared in the same manner as in the example 8. The solution is referred to as the resin solution 5.

| Resin Solution 5 | |
| --- | --- |
| Ion-exchanged water | 69.2 parts |
| 28% ammonia water | 4.6 parts |
| Ethyldiethanolamine | 1.2 parts (10%) |
| Hairos X-200 | 25.0 parts |

The resin solution 5 was mixed with the components below under stirring to provide a yellow color marking pen ink having a pH of 8.8.

| Dipropylene glycol | 20.0 parts |
| Ion-exchanged water | 34.0 parts |
| C.I. Acid Yellow 110 | 5.0 parts |
| Sodium benzoate | 1.0 part |
| Resin solution 4 | 40.0 parts |

EXAMPLE 11

A 25% aqueous solution of SMA Resin 1440 having a neutralization degree of 100% and composed of the following components was prepared in the same manner as in the example 8. The solution is referred to as the resin solution 6.

| Resin Solution 6 | |
| --- | --- |
| Ion-exchanged water | 69.9 parts |
| 28% ammonia water | 4.5 parts |
| Triethanolamine | 0.6 parts (5%) |
| SMA Resin 1440 | 25.0 parts |

The resin solution 6 was mixed with the components below under stirring to provide a blue color marking pen ink having a pH of 7.8.

| Propylene glycol | 15.0 parts |
| Diethylene glycol monomethyl ether | 5.0 parts |
| Ion-exchanged water | 35.0 parts |
| C.I. 42655 | 4.0 parts |
| Sodium benzoate | 1.0 part |
| Resin solution 6 | 40.0 parts |

EXAMPLE 12

A 25% aqueous solution of Hairos X-205 having a neutralization degree of 100% and composed of the following components was prepared in the same manner as in the example 8. The solution is referred to as the resin solution 7.

| Resin Solution 7 | |
| --- | --- |
| Ion-exchanged water | 69.2 parts |
| 28% ammonia water | 5.0 parts |
| Sodium hydroxide | 0.3 parts (10%) |
| Hairos X-205 | 25.0 parts |

The resin solution 7 was mixed with the components below under stirring to provide a red color marking pen ink having a pH of 8.5.

| Ethylene glycol | 18.0 parts |
| --- | --- |
| Ethylene glycol monomethyl ether | 2.0 parts |
| Ion-exchanged water | 34.0 parts |
| C.I. 23635 | 5.0 parts |
| Sodium benzoate | 1.0 part |
| Resin solution 7 | 40.0 parts |

EXAMPLE 13

A 25% aqueous solution of Hairos X-205 having a neutralization degree of 100% and composed of the following components was prepared in the same manner as in the example 8. The solution is referred to as the resin solution 8.

| Resin Solution 8 | |
| --- | --- |
| Ion-exchanged water | 69.5 parts |
| 28% ammonia water | 5.5 parts |
| Hairos X-205 | 25.0 parts |

The resin solution 8 was mixed with the components below under stirring to provide a black color marking pen ink having a pH of 9.2.

| Ethylene glycol | 20.0 parts |
| --- | --- |
| Ion-exchanged water | 33.5 parts |
| C.I. 35255 | 5.5 parts |
| Sodium benzoate | 1.0 part |
| Resin solution 7 | 40.0 parts |

EXAMPLE 14

The resin solution 8 was mixed with the components below under stirring to provide a blue color marking pen ink having a pH of 7.9.

| Dipropylene glycol | 15.0 parts |
| --- | --- |
| Propylene glycol monomethyl ether | 5.0 parts |
| Ion-exchanged water | 35.0 parts |
| C.I. 42655 | 4.0 parts |
| Sodium benzoate | 1.0 part |
| Resin solution 8 | 40.0 parts |

EXAMPLE 15

The resin solution 8 was mixed with the components below under stirring to provide a black color marking pen ink having a pH of 8.7.

| Ethylene glycol | 20.0 parts |
| --- | --- |
| Ion-exchanged water | 33.5 parts |
| C.I. Acid Black 107 | 5.5 parts |
| Sodium benzoate | 1.0 part |
| Resin solution 8 | 40.0 parts |

EXAMPLE 16

The resin solution 7 was mixed with the components below under stirring to provide a brown color marking pen ink having a pH of 8.8.

| Propylene glycol | 30.0 parts |
| --- | --- |
| Ion-exchanged water | 25.0 parts |
| C.I. Acid Orange 122 | 5.0 parts |
| Resin solution 7 | 40.0 parts |

EXAMPLE 17

The resin solution 7 was mixed with the components below under stirring to provide a black color marking pen ink having a pH of 9.4.

| Ethylene glycol | 25.0 parts |
| --- | --- |
| Ion-exchanged water | 34.0 parts |
| C.I. 53255 | 6.0 parts |
| Resin solution 7 | 40.0 parts |

There are given ink compositions as comparative examples below. The comparative examples 1, 2 and 6 use a direct dye which falls under neither the group (a) nor the group (b) nor the groups (c), and the comparative examples 3, 4 and 5 use an acid dye which falls under neither the group (a) nor the group (b) nor the groups (c).

Comparative Example 1

The resin solution 1 was mixed with the components below under stirring to provide a red color marking pen ink having a pH of 8.0.

| Ethylene glycol | 20.0 parts |
| --- | --- |
| Ion-exchanged water | 34.0 parts |
| C.I. 29100 (Direct Red) | 5.0 parts |
| Sodium benzoate | 1.0 part |
| Resin solution 1 | 40.0 parts |

Comparative Example 2

The resin solution 2 was mixed with the components below under stirring to provide a blue color marking pen ink having a pH of 7.6.

| Ethylene glycol | 20.0 parts |
| --- | --- |
| Ion-exchanged water | 34.5 parts |
| C.I. 24410 (Direct Blue) | 4.5 parts |
| Sodium benzoate | 1.0 part |
| Resin solution 2 | 40.0 parts |

Comparative Example 3

The resin solution 1 was mixed with the components below under stirring to provide an orange color drawing ink having a pH of 9.0.

| | |
|---|---|
| Propylene glycol | 3.0 parts |
| Ion-exchanged water | 66.5 parts |
| C.I. 22895 (Acid Orange) | 1.5 parts |
| Resin solution 1 | 30.0 parts |

Comparative Example 4

The resin solution 2 was mixed with the components below under stirring to provide a pink color marking pen ink having a pH of 8.1.

| | |
|---|---|
| Ethylene glycol | 20.0 parts |
| Ion-exchanged water | 33.5 parts |
| C.I. 45410 (Acid Red) | 5.5 parts |
| Sodium benzoate | 1.0 part |
| Resin solution 2 | 40.0 parts |

Comparative Example 5

The resin solution 8 was mixed with the components below under stirring to provide a blue color marking pen ink having a pH of 7.5.

| | |
|---|---|
| Ethylene glycol | 27.0 parts |
| Ion-exchanged water | 25.0 parts |
| C.I. 42090 (Acid Blue) | 7.0 parts |
| Sodium benzoate | 1.0 part |
| Resin solution 8 | 40.0 parts |

Comparative Example 6

The resin solution 8 was mixed with the components below under stirring to provide a blue color marking pen ink having a pit of 8.0.

| | |
|---|---|
| Propylene glycol | 25.0 parts |
| Ion-exchanged water | 26.0 parts |
| C.I. 24110 (Direct Blue) | 8.0 parts |
| Sodium benzoate | 1.0 part |
| Resin solution 8 | 40.0 parts |

IV. Performance Evaluation of Ink Composition Containing Half-Esterified Styrene-Maleic acid Resin Some of the above ink compositions and some of the conventional ink compositions were subjected to performance evaluation in the same manner as hereinbefore set forth.

The ink composition of the examples 4 and 11 were taken as representatives of the invention, whereas the ink compositions of the comparative examples 5 and 6 were taken as representatives of the ink composition containing an anionic dye other than specified in the invention.

The oil base ink composition used here was the same as used hereinbefore. An pigment ink composition was prepared as follows.

Pigment ink composition

A pigment base was first prepared which was composed of the following components.

| Pigment Base | |
|---|---|
| Resin solution 3 | 40.0 parts |
| Color Black SB-5*) | 22.5 parts |
| Ethylene glycol | 10.0 parts |
| Ion-exchanged water | 27.5 parts |

*) Carbon black available from Degussa, Germany

Using the above pigment base, a pigment ink composition composed of the components below was prepared.

| | |
|---|---|
| Pigment base | 33.3 parts |
| Resin solution 3 | 11.3 parts |
| Neocol YSK*) | 0.4 parts |
| Ethylene glycol | 3.0 parts |
| Ion-exchanged water | 52.0 parts |

*) Sodium dialkyl sulfosuccinate available from Dai-Ichi Kogyo Seiyaku K.K., Japan The performance test was effected in the same manner as hereinbefore. The results are substantially the same as those with the ink compositions containing the styrene-acrylic resin, as indicated in Table 2.

TABLE 2

| | Water Resistance | Light Resistance | Storability | Resistance to Penetration |
|---|---|---|---|---|
| Water base pigment ink | B | A | C | B |
| Oil base ink | B | B | B | C |
| Invention | B | B | B | B |
| Anionic dye ink*) | C | B | B | B |

Note:
*) Water base in composition containing an anionic dye other than the specified in the invention.

A water base ink composition which contains an anionic dye other than the specified according to the invention such as exemplified by the comparative examples 5 (C.I. 42090) or 6 (C.I. 24110) form a writing having substantially no water resistance.

The resistance to drying was also tested in the same manner as hereinbefore. The ink compositions of examples 13 and 14 were taken as representatives of ink compositions containing a volatile alkali, and the examples 4 and 11 as representatives of ink compositions containing a nonvolatile alkali together with a volatile alkali.

It was found that the ink compositions of the examples 13 and 14 were capable of writing well after about one hour, and the ink compositions of the examples 13 and 14 were capable of writing well even after about three hours.

What is claimed is:

1. A water based dye ink composition for use in a marking pen comprising a hollow holder, an ink reservoir held therein composed of a porous body impregnated with the ink composition within the hollow holder and a porous pen tip to which the ink composition is supplied from the reservoir, thereby permitting it to form a writing, wherein the ink composition comprises:

(i) water as a solvent;

(ii) a carboxyl group containing styrenic resin selected from the group consisting of styrene-acrylic acid resin and a half-esterified styrene-maleic acid resin, which has an average molecular weight of 1500 to 30000 and an acid value of 150 to 300, in an amount of 2 to 20% by weight;

(iii) at least one anionic dye selected from the group consisting of:
(a) a metal complex azo acid dye;
(b) C.I. direct black; and
(c) C.I. acid yellow 110, C.I. acid yellow 127, C.I. direct yellow 100, C.I. 20215, C.I. 20216, C.I. 20230, C.I. 23266, C.I. 23635, C.I. 40002, C.I. 40215, C.I. 42655 and C.I. 42660, in an amount of 0.01 to 10% by weight;

(iv) an alkali in such an amount as to put the ink composition at a pH in the range of 6 to 9.5 and in an amount of 85 to 105% of the theoretical amount necessary to neutralize the carboxyl groups of the styrenic resin; wherein the alkali comprises:
(a) a first alkali which is volatile at normal temperatures; and
(b) a second alkali which is substantially nonvolatile at room temperature which is at least one alkanolamine selected from the group consisting of triethanolamine, ethyldiethanolamine, diethylethanolamine, methyldiethanolamine and dimethylmonoethanolamine, or at least one alkaline earth metal hydroxide selected from the group consisting of sodium hydroxide and potassium hydroxide, in an amount of up to 50% of the amount required to neutralize the styrenic resin.

2. The ink composition as claimed in claim 1 wherein the first alkali is ammonia water.

3. The ink composition as claimed in claim 1 which further contains a water soluble organic solvent represented by the formula $$H-(OR^2)_n-OR^2$$

wherein when $R^1$ is an ethylene group and $R^2$ is a hydrogen, n is an integer of 1 to 4; when $R^1$ is an ethylene group and $R^2$ is a methyl group, n is 1 or 2; and when $R^1$ is a propylene group, $R^2$ is a hydrogen or a methyl group, and n is 1 or 2.

4. The ink composition as claimed in claim 1 wherein the styrenic resin has an average molecular weight of 1800–15000 and an acid value of 180–250.

* * * * *